(12) United States Patent
Honegger

(10) Patent No.: US 12,339,436 B2
(45) Date of Patent: Jun. 24, 2025

(54) DIGITAL MICROSCOPE SYSTEM, METHOD FOR OPERATING THE SAME AND COMPUTER PROGRAM

(71) Applicant: LEICA INSTRUMENTS (SINGAPORE) PTE. LTD., Singapore (SG)

(72) Inventor: Marc Honegger, Romanshorn (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 911 days.

(21) Appl. No.: 17/417,826

(22) PCT Filed: Dec. 19, 2019

(86) PCT No.: PCT/EP2019/086177
§ 371 (c)(1),
(2) Date: Jun. 24, 2021

(87) PCT Pub. No.: WO2020/136069
PCT Pub. Date: Jul. 2, 2020

(65) Prior Publication Data
US 2022/0057619 A1    Feb. 24, 2022

(30) Foreign Application Priority Data
Dec. 27, 2018   (EP) ..................... 18248053

(51) Int. Cl.
*G02B 21/36*   (2006.01)
*G02B 21/02*   (2006.01)
*G02B 21/26*   (2006.01)

(52) U.S. Cl.
CPC ......... *G02B 21/365* (2013.01); *G02B 21/025* (2013.01); *G02B 21/26* (2013.01)

(58) Field of Classification Search
CPC ...... G02B 21/00; G02B 21/02; G02B 21/025; G02B 21/18; G02B 21/36; G02B 21/365;
(Continued)

(56) References Cited

U.S. PATENT DOCUMENTS

2004/0101210 A1* 5/2004 Weinstein ............ G02B 21/002
382/128
2005/0270639 A1   12/2005 Miki
(Continued)

FOREIGN PATENT DOCUMENTS

EP        2690482 A1    1/2014
JP        H0736116 U    7/1995
(Continued)

*Primary Examiner* — Jyotsna V Dabbi
(74) *Attorney, Agent, or Firm* — Hodgson Russ LLP

(57) ABSTRACT

A digital microscope system includes a plurality of camera systems for imaging a target region of an object, each camera system having a digital camera and an optical imaging system being aligned along an optical axis of the camera system, wherein the optical axes of the camera systems are parallel to each other; a microscope stage, on which the object is to be arranged; a positioning device; and a controller configured to control the positioning device to move the plurality of camera systems and the microscope stage relative to each other orthogonally to the optical axes of the camera systems for selectively aligning any one of the camera systems with the target region of the object.

16 Claims, 3 Drawing Sheets

(58) Field of Classification Search
CPC .... G02B 21/26; G02B 21/361; G02B 21/367; G06T 7/70; G06T 2207/10056; G01N 2035/00039; G01N 21/6458
USPC .......................................................... 359/368
See application file for complete search history.

(56) References Cited

U.S. PATENT DOCUMENTS

| | | |
|---|---|---|
| 2008/0206774 A1* | 8/2008 | Tafas ................. G01N 21/6458 435/6.12 |
| 2013/0038727 A1 | 2/2013 | Clark |
| 2014/0063226 A1* | 3/2014 | Kawata ................... G06F 3/041 348/80 |
| 2015/0028193 A1 | 1/2015 | Fujinuma et al. |
| 2015/0198797 A1* | 7/2015 | Andre .................. A61B 90/361 348/80 |
| 2015/0317507 A1 | 11/2015 | Liebel et al. |
| 2016/0018976 A1 | 1/2016 | Kaieda |

FOREIGN PATENT DOCUMENTS

| | | |
|---|---|---|
| JP | 2004021006 A | 1/2004 |
| JP | 2004170481 A | 6/2004 |
| JP | 2015213139 A | 11/2015 |

* cited by examiner

DIGITAL MICROSCOPE SYSTEM, METHOD FOR OPERATING THE SAME AND COMPUTER PROGRAM

CROSS-REFERENCE TO RELATED APPLICATIONS

The present application is the U.S. national phase of International Application No. PCT/EP2019/086177 filed Dec. 19, 2019, which claims priority of European Application No. 18248053.3 filed Dec. 27, 2018, the entire disclosure of which is incorporated herein by reference.

TECHNICAL FIELD

The present disclosure relates to a digital microscope system, a method for operating a digital microscope system, and a computer program with a program code for performing the method.

BACKGROUND

Digital microscope systems comprising a plurality of camera systems are known. For instance, a plurality of camera systems can be used to image different target regions of the object or to image a single target region based on different magnifications. Usually, the camera systems are arranged side-by-side. As a result, the optical axes of the camera systems, along which the object is to be imaged, extend side-by side likewise. Due to such a lateral offset of the optical axis, perspective differences occur in the object images generated by the different camera systems. Whereas it is conceivable to correct those perspective differences by means of image processing, such a correction can only be achieved to a limited extent and with great computational effort.

Due to the perspective differences as described above, conventional digital microscope systems are of limited use for example when the individual camera images are to be superimposed to a single overall image.

Therefore, it is an object of the present disclosure to provide a digital microscope system that allows imaging of an object with high imaging quality.

SUMMARY

In order to achieve the afore-mentioned object, a digital microscope system is provided, comprising a plurality of camera systems for imaging a target region of an object, each camera system comprising a digital camera and an optical imaging system being aligned along an optical axis of said camera system wherein the optical axes of the camera systems are parallel to each other; a microscope stage, on which the object is to be arranged; a positioning device; and a controller configured to control the positioning device to move the plurality of camera systems and the microscope stage relative to each other orthogonally to the optical axes of the camera systems for selectively aligning any one of the camera systems with the target region of the object.

According to the embodiment described above, a relative shifting movement is performed between the camera systems and the microscope stage in order to selectively activate one of the camera systems as a system which is currently to be used for imaging the target region of the object. In case that the camera systems are moved, this movement is performed such that the plurality of camera systems is laterally shifted as a unit without moving the individual camera systems relative to each other. Thus, the digital microscope system can easily be controlled in such a way that, when successively switching between the individual camera systems, any perspective differences between the images generated by the individual camera systems can be avoided. Therefore, it is possible to superimpose the individual images generated by the camera systems to an overall image being free from any perspective distortion. As a result, the digital microscope systems enables an imaging of the object with high image quality.

Preferably, the digital microscope system comprises a microscope head including the plurality of camera systems, wherein the positioning device is configured to move the microscope head orthogonally to the optical axes of the camera systems. Providing a microscope head, in which the camera systems are integrated, enables an easy control of the digital microscope system in terms of the lateral shifting movement for activating the individual camera systems.

In a preferred embodiment, the optical axes of the camera systems are arranged on a common plane, and the positioning device is configured to move the camera systems along the said plane. In this embodiment, camera systems are arranged side-by-side in a lateral direction in which the relative movement between the camera systems and the microscope stage occurs. Thus, a compact and space-saving configuration is achieved.

Preferably, the digital microscope system has a total magnification range being composed of a plurality of magnification subranges provided by the plurality of magnification changing systems. Accordingly, dependent on the total number of camera systems, a large magnification range can be achieved. In this respect, the afore-mentioned subranges are not meant to be restricted to widely extending magnification ranges. Rather, the subranges may also be understood as to cover discrete, i.e. fixed magnification values.

Preferably, at least one of the camera systems comprises a magnification changing system. Such a camera system may be for example combined with another camera system including a fixed magnification optical system providing a single magnification.

In a preferred embodiment, the magnification changing system comprises a zoom system.

Such a zoom system may comprise an optical zoom system formed by the imaging optical system of the respective camera system. The optical zoom system enables the target region of the object to be imaged with high image quality.

Additionally or alternatively, the zoom system may comprise a digital zoom system formed by the respective digital camera. Such a digital zoom system allows a fast and low-cost adjustment of the size of the target region as no further optical elements are required for changing the magnification.

Further, the magnification changing system may comprise a fixed magnification optical system formed by the imaging optical system.

In a specific embodiment, the magnification changing system of one of the plurality of the camera systems may comprise an optical zoom system, and the magnification changing system of another of the plurality of camera systems may comprise a digital zoom system. Combining an optical zoom system with a digital zoom system enables particularly flexible use of the digital microscope system. For instance, on the one hand, the digital zoom system may be used to quickly zoom in and zoom out within the respective magnification range as the digital zoom system does not require any mechanical movement of optical elements. On the other hand, the optical zoom system may be used for a zoom operation meeting high standards in terms of image quality.

Preferably, the controller is further configured to receive a user input specifying an imaging parameter based on which the target region is to be imaged, to select one of the plurality of camera systems to be aligned with the target region based on the imaging parameter, and to control the positioning device for aligning the selected camera system with the target region. The imaging parameter may comprise one of an image resolution and a magnification based on which the target region is to be imaged. According to this embodiment, the user only has to set the desired imaging parameter whereupon the controller automatically selects one of the camera systems which is suitable to generate an image of the target region in accordance with the imaging parameter. For instance, in case that the controller determines that the currently activated camera system is not able or is at least not the best option to perform the imaging based on the imaging parameter, the controller causes the positioning device for aligning another camera system being suitable to generate an image based on the imaging parameter. In particular, there is no need for the user to select a suitable camera system by himself, making the operation of the digital microscope system easier.

In a preferred embodiment, the controller is further configured to control the positioning device for selectively aligning any one of the optical axes of the plurality of camera systems with a predetermined target position of the object, the target position being the same regardless of the selected camera system. The target position may be a center of the target region. Thus, the user of the digital microscope system is enabled to observe the images generated by the different camera systems with reference to a single and unchanging target position.

In a preferred embodiment, the camera systems are configured to generate digital image data representing the target region in accordance with a setting, said setting determining which one of the plurality of camera systems is to be aligned with the object. The controller may further be configured to generate monitor image data corresponding to the digital image data generated in accordance with the setting, the monitor image data being configured to be displayed as a monitor image. The controller may be configured to change the setting in response to a user input. The controller may be configured to compensate for a delay in updating the monitor image data in accordance with the changed setting by storing the digital image data generated in accordance with the unchanged setting in response to the user input and generating simulation monitor image data by performing digital image processing on the stored digital image data taking into account the changed setting, the simulation monitor image data being configured to be displayed as a simulation monitor image during the delay.

The afore-mentioned setting may be defined by the imaging parameter described above, without being limited thereto. In any case, the setting may directly or indirectly define which of the plurality of camera systems is to be activated for imaging the target region. According to the above embodiment, a simulation monitor image can be displayed during a delay between the point in time at which the user input for changing the setting is received, and the point in time at which the change of setting has actually been completed. For this, digital image processing is performed on the digital image data which has been generated on the basis of the unchanged setting, wherein the digital image processing takes into account the new setting being changed by the user input. Thus, it is possible to display a monitor image reflecting the changed setting at a time at which the change of setting has not yet been completed. As a result, the user is enabled to operate the digital microscope system in a manner which is perceived as responsive and intuitive. In particular, the user can intuitively switch between the different camera systems while observing the corresponding reaction of the digital microscope system directly on a monitor. In other words, as the system reaction in response to the user action exhibits a certain delay, e.g. due to hardware and image transfer latencies, the monitor image is digitally simulated during the delay. For example, when the use switches from a first camera system to a second camera system, the current digital image generated by the first camera system is frozen, i.e. stored in a first step, and a digitally enlarged or reduced version of the image is displayed on the monitor as long as switching of the camera system is not yet completed. Thus, although the operation of the digital microscope system for changing the camera system is not yet completed as this point of time, the user can already observe an approximation of the monitor image resulting from the change of setting. After a certain time, when the microscope hardware has actually completed the change of the camera system corresponding to the changed setting, the simulation monitor image displayed on the monitor is replaced with the live image corresponding to the changed setting.

A further advantage of this embodiment can be seen in avoiding any additional effort for reducing latency times with respect to the change of the camera system, as such effort is often associated with cost-intensive development and hardware costs.

It is preferable that the controller is configured to generate the simulation monitor image data in response to the user input as real-time image data configured to enable real-time navigation on a monitor for changing the camera system which is intended to generate the digital image data. Thus, the user is enabled to operate the digital microscope system in a responsive and intuitive manner.

According to another aspect, a method for operating a digital microscope system is provided, comprising the steps of positioning an object on an optical axis of a first camera system and imaging the object by means of the first camera system, receiving a positioning signal, positioning the object in accordance with the positioning signal on an optical axis of a second camera system, and imaging the object by means of the second camera system.

According to another aspect of the present disclosure, a computer program with a program code is provided for performing the above method, when the computer program is run on a processor.

SHORT DESCRIPTION OF THE FIGURES

Hereinafter, preferred embodiments are described with reference to the drawings in which.

DETAILED DESCRIPTION

Figure 1:
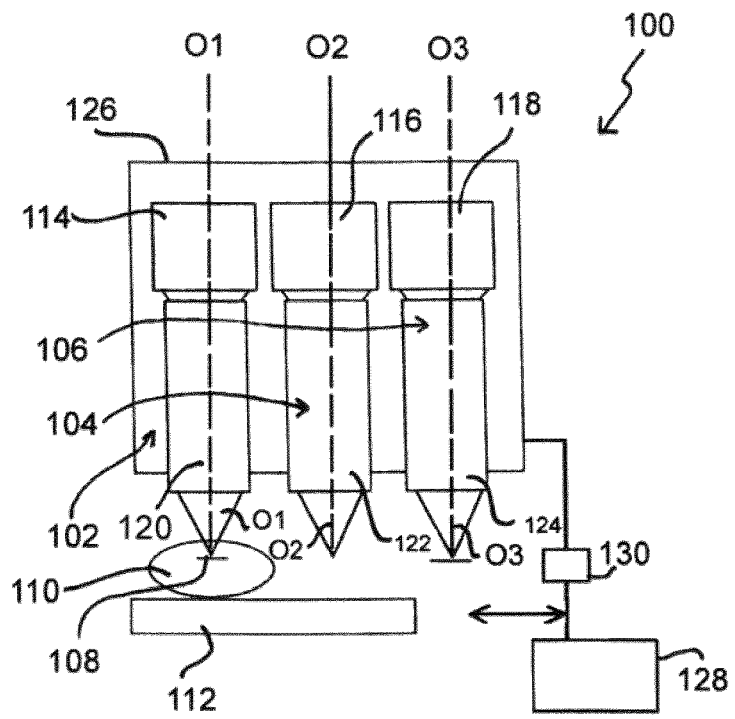
FIG. 1 is a diagram illustrating a digital microscope system according to an embodiment of the present disclosure, wherein a first of a plurality of camera systems is activated for imaging a target region of an object.

FIG. 1 is a diagram showing a digital microscope system 100 according to an embodiment of the present disclosure.

The digital microscope system 100 comprises a plurality of camera systems 102, 104, 106 which are configured to image a target region 108 of an object 110 arranged on a microscope stage 112. Each of the camera systems 102, 104, 104 comprises a digital camera 114, 116, 118 and an optical imaging system 120, 122, 124 which are aligned along an optical axis O1, O2, O3 of the respective camera system 102, 104, 106. The camera systems 102, 104, 106 are arranged such that the optical axes O1, O2, O3 are parallel to each other. The camera systems 102, 104, 106 may be included in a microscope head 126.

The digital microscope system 100 further comprises a controller 128 which is configured to control the overall operation of the digital microscope system 100. In particular, the controller 128 serves to selectively activate one of the plurality of camera systems 102, 104, 106 such that the selected camera system images the target region 108 of the object 110. For this, the controller 128 is configured to control a positioning device 130 to integrally move the plurality of camera systems 102, 104, 106 and the microscope stage 112 relative to each other orthogonally to the optical axes O1, O2, O3 of the camera systems 102, 104, 106 for selectively aligning anyone of the camera systems 102, 104, 106 with the target region 108 of the object 110. In particular, the controller 128 is configured to control the positioning device 130 such that the optical axis of the selected camera system is aligned with a predetermined target position of the object 110 wherein this target position is the same position, regardless of which of the plurality of camera systems is currently selected, i.e. activated.

According to the embodiment shown in FIG. 1, the positioning device 130 is configured to move the microscope head 126 in a direction orthogonal to the optical axis O1, O2, O3 of the camera systems 102, 104, 106. However, a relative movement between the camera systems 102, 104, 106 and the microscope stage 112 may also be achieved by laterally moving the microscope stage 112 rather than the microscope head 126.

The optical axes O1, O2, O3 of the camera systems 102, 104, 106 may be arranged on a common plane. According to the present embodiment, this common plane is parallel to the drawing plane of FIG. 1. Accordingly, the positioning device 130 is configured to move integrally move the camera systems 102, 104, 106 along said common plane relative to the microscope stage 112.

Figure 2:
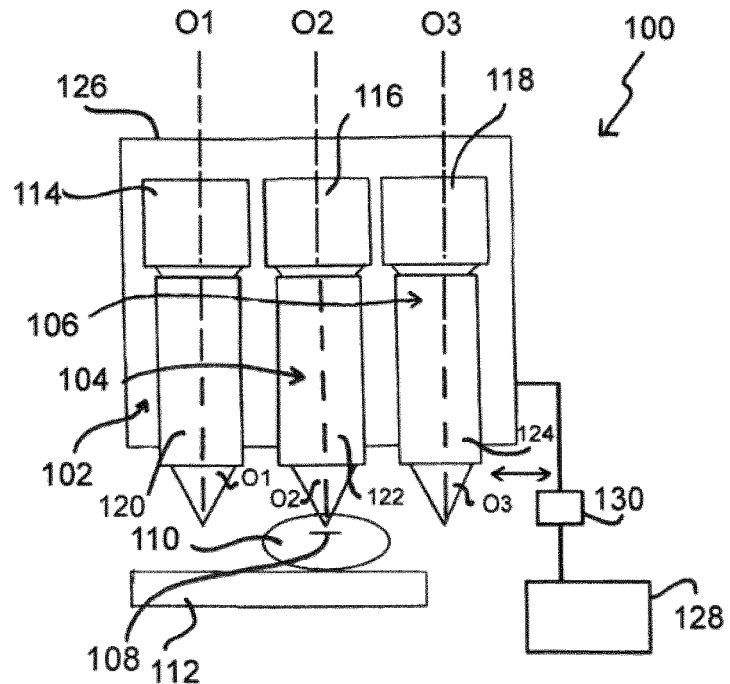
FIG. 2 is a diagram illustrating the digital microscope system shown in FIG. 1, wherein a second of the plurality of camera systems is activated for imaging the target region.

In the example of FIG. 1, the first camera system 102 is activated to generate a digital image of the target region 108 of the object 110 (when seen from the left to the right in FIG. 1). In contrast, FIG. 2 shows a state in which the second camera system 104 has been selected for imaging the target region 108. In order to switch from the state in FIG. 1 to the state in FIG. 2, the controller 128 causes the positioning device 130 to laterally shift the microscope head 126 relative to the microscope stage 112 such that the optical axis O2 of the camera system 104 is aligned with the target region 108 rather than the optical axis O1 of the first camera system 102. In particular, the optical axis O2 of the second camera system 104 is aligned with the same target position with which the optical axis O1 of the first camera system was aligned before switching the camera systems. The target position with which the optical axis of the respective camera system is to be aligned may be a center of the target region 108.

The digital microscope system 100 may advantageously be used to provide a total magnification range which is composed of a plurality of magnification subranges wherein these subranges are associated to the plurality of camera systems 102, 104, 106. For this purpose, at least one of the camera systems 102, 104, 106 shown in FIGS. 1 and 2 may comprise a magnification changing system, i.e. a system which is configured to image the target region 108 of the object 110 based on a magnification being variable in accordance with a user setting. In particular, the respective magnification changing system may comprise a zoom system. For instance, in the embodiment shown in FIGS. 1 and 2, the optical imaging systems 120, 122, 124 included in the camera systems 102, 104, 106 may form separate optical zoom systems providing separate zoom subranges, wherein these zoom subranges merge to a composite zoom range.

An exemplary configuration as described above may be used to automatically select one of the camera systems 102, 104, 106 based on an imaging parameter which is received by the controller 128 via a user input. For example, the user may specify one of an image resolution and a magnification based on which the target region 108 shall be imaged, and the controller 128 determines based on the received imaging parameter which one of the plurality of camera systems is to be aligned with the target region 108. Then, the controller causes the positioning device 130 to laterally shift the camera head 126 in order to make the optical axis of the selected camera system coincide with the target region 108 of the object 110.

In an alternative embodiment, the magnification changing system may comprise a digital zoom system which is formed by the respective digital camera 114, 116, 118. In this respect, the digital camera 114, 116, 118 may be formed as a high-resolution camera in order to achieve an effective zoom function. Such a digital zoom configuration may be used in the same way as the optical zoom configuration described above.

Further, in terms of its zoom function, the digital microscope system 100 shown in FIGS. 1 and 2 may also form a hybrid configuration which includes both an optical zoom system being formed by the respective imaging optical system 120, 122, 124 and a digital zoom system 114, 116, 118 being formed by the respective digital camera 114, 116, 118. Thus, according to the embodiment shown in FIGS. 1 and 2, one of the camera systems 102, 104, 106 may provide an optical zoom function, whereas the other camera systems may provide a digital zoom function.

In a further exemplary configuration, at least one of the camera systems 102, 104, 106 may comprise a fixed magnification optical system which is formed by the respective imaging optical system 120, 122, 124. In such a configuration, the camera system may either be used to provide a single fixed magnification or a zoom magnification. In the latter configuration, the digital camera 114, 116, 118 included in the respective camera system 102, 104, 106 may form a digital zoom system, as described above.

Figure 3:
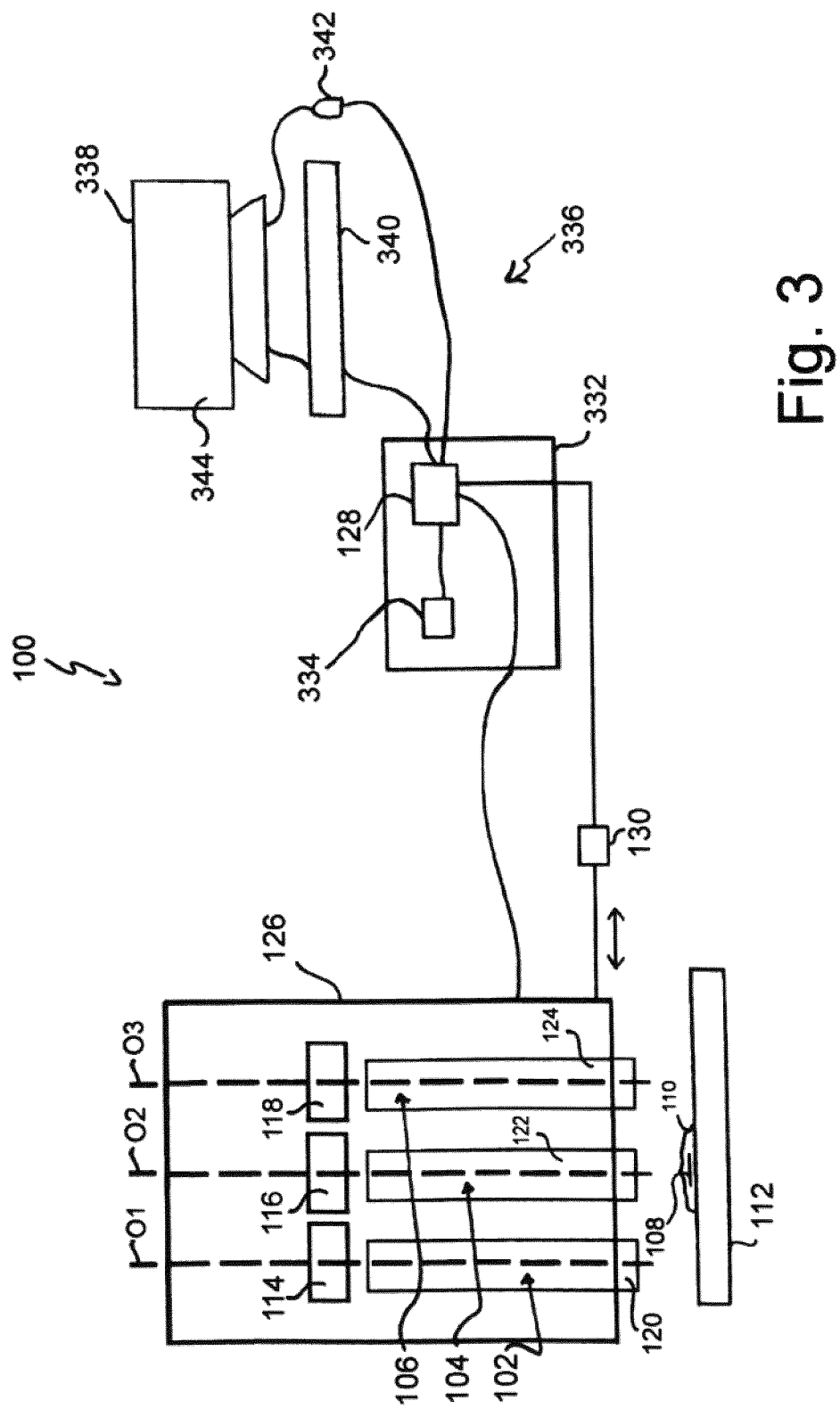
FIG. 3 is a diagram illustrating the digital microscope system shown in FIGS. 1 and 2 with further optional components.

FIG. 3 illustrates an overall configuration of the digital microscope system 100 which may include further optional components.

As already shown in FIGS. 1 and 2, the digital microscope system 100 comprises the microscope head 126, the microscope stage 112, the positioning device 130 and the controller 128. The controller 128 may be included in a processor 332 which further comprises a memory 134. The processor 332 belongs to a computer system 336 which further comprises a monitor 338 and an input device which includes for example a keyboard 340 and a pointing device 342 such as computer mouse etc. The input device may further comprise a touchscreen 344 which is integrated with a screen of the monitor 338.

As already mentioned above, the controller 128 is configured to control the overall operation of the digital microscope system 100. For this purpose, the controller 128 is connected to the individual components of the digital microscope system 100, in particular to the microscope head 126, the monitor 338, the keyboard 340 and the computer mouse 342. Further, the controller is 128 connected to the positioning device 130 enabling the relative movement between the microscope stage 112 and the microscope head 126 in order to switch between the individual camera systems 102, 104, 106. The lateral movement between the microscope head 126 and the microscope stage 112 is illustrated by a double arrow in FIG. 1.

The target region 108 of the object 110 to be imaged by the microscope head 126 is determined by a changeable setting. Such changeable setting may comprise a lateral position of the microscope head 126 relative to the microscope stage 112. Alternatively or additionally, the setting may comprise an imaging parameter as described above, for example one of an image resolution and a magnification. In principle, the afore-mentioned setting determines which one of the plurality of camera systems 102, 104, 106 is selectively aligned with the target region 108 of the object 110.

The setting of the microscope head 126 is changed by the controller 128 in response to a user input performed by the user operating the input device, i.e. at least one of the keyboard 340, the computer mouse 342 and the touchscreen 344 in the present disclosure. Herein, it is assumed that the change of the setting performed by the controller 128 takes a certain time. In other words, it is assumed that there is a delay between the time at which the user input is received by the controller 128 and the time at which the change of setting is completed so that the object 110 can be imaged in accordance with the new setting.

According to the present embodiment, the user is enabled to perform a real-time navigation on the monitor 338 in terms of selecting one of the camera systems 102, 104, 106 despite the afore-mentioned delay. Thus, the camera system 102, 104, 106 currently aligned with the target region 108 generates digital image data representing the target region 108. Then, the controller 128 generates monitor image data corresponding to the digital image data which has been generated by the camera system 102, 104, 106 in accordance with the current setting. The monitor image data represents data which is configured to be displayed on the monitor 338 in form of a monitor image.

In case that the controller 128 receives a user input which directly or indirectly indicates that the camera system 102, 104, 106 has to be changed by another camera system, the controller 128 stores the digital image data, which has been generated in accordance with the unchanged setting, in the memory 334 of the processor 332. In other words, the controller 128 freezes the digital image based on the unchanged setting.

After having received the user input, the controller 128 starts to change the setting, i.e. the controller 128 starts to control the positioning device 130 to laterally shift the microscope head 126 relative to the microscope stage 112 in order to align the new camera system 102, 104, 106 with the target region 108 in accordance with the setting. For the present embodiment, it is assumed that the change of the setting involves a delay starting from receiving the user input to the completion of updating the setting, i.e. the completion of switching the camera system. Then, the controller 128 performs digital processing on the image data stored in the memory 334 taking into account the changed setting in order to generate simulation monitor image data representing an approximation of a monitor image which is to be generated in accordance with the user input. Then, a simulation monitor image is displayed on the monitor 338, this simulation monitor image being represented by the simulation monitor image data generated before. Accordingly, during the delay which occurs when the monitor image data is updated in accordance with the changed setting, the simulation monitor image data is displayed on the monitor 338. In other words, displaying the simulation monitor image serves to compensate for the afore-mentioned delay.

Subsequently, it is determined whether or not the change of setting is completed. If the change of setting is not yet completed, i.e. if the delay is still continuing, the simulation monitor image is continued to be displayed on the monitor 338. On the other hand, if it is determined that the change of setting has been completed, the microscope head 126 generates new digital image data in accordance with the setting which has been changed based on the user input. Then, the controller 128 generates updated monitor image data corresponding to the newly generated digital image data. Finally, an updated monitor image is displayed on the monitor 338.

As a result of the process described above, the controller 128 of the digital microscope system 100 generates the simulation monitor image data in response to the user input as real-time image data configured to enable real-time navigation on the monitor 338 for switching to the camera system 102, 104, 106 which shall generate the digital image data.

Figure 4:
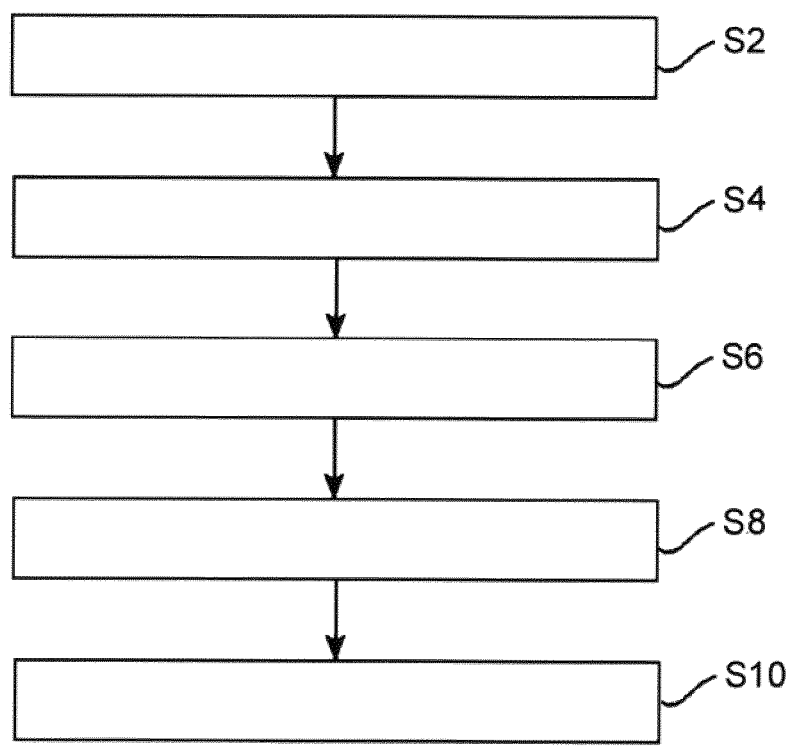
FIG. 4 is a flow diagram illustrating an exemplary method for operating the digital microscope system shown in FIGS. 1 to 3.

As explained above, the digital microscope system 100 is configured to selectively align one of the camera systems 102, 104, 106 with the target region 108 of the object 110. The principle of a method for correspondingly operating the digital microscope system 100 is exemplified by the flow diagram shown in FIG. 4.

The method starts with step S2 in which the target region 108 of the object 110, in particular the afore-mentioned invariant target position of the object 110 is arranged on the optical axis of one of the camera systems, e.g. on the first optical axis O1 of the first camera system 102. For this, the controller 102 causes the positioning device 130 to move the microscope head 126 in the corresponding lateral position with respect to the microscope stage 112, provided that the first camera system 102 is not yet aligned with the target region 108.

Subsequently, in step S4, the first camera system 102 images the target region 108 of the object 110 by generating corresponding digital image data.

Then, in step S6, it is assumed that the controller 128 receives a positioning signal being based on a user input.

Then, in step S8, the controller 128 causes the positioning device 130 to position the target region 108 in accordance with the positioning signal received in step S6 on an optical axis of another camera system, e.g. on the optical axis O2 of the second camera system 104. For this purpose, the positioning device 130 laterally shifts the microscope head 126 such that the first camera system 102 removed from the target region 108 and the second camera system 104 is brought into coincidence with the target region 108, i.e. the second optical axis O2 is aligned with the target position of the object 110.

Finally, in step S10, the second camera system 104 images the target region 108 by generating corresponding digital image data.

According to the embodiments described above, the digital microscope system 100 comprises three camera systems 102, 104, 106. Needless to say that the total number of camera systems may be different from three.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the disclosure can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the disclosure comprise a data carrier having electronically readable control signals, which are capable of cooperating with a programmable computer system, such that one of the methods described herein is performed.

Generally, embodiments of the present disclosure can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present disclosure is, therefore, a computer program having a program code for performing one of the methods described herein, when the computer program runs on a computer.

A further embodiment of the present disclosure is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present disclosure is an apparatus as described herein comprising a processor and the storage medium.

A further embodiment of the disclosure is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the disclosure comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

LIST OF REFERENCE SIGNS 100 digital microscope system
102 camera system
104 camera system
106 camera system
108 target region
110 object
112 microscope stage
114 digital camera
116 digital camera
118 digital camera
120 optical imaging system
122 optical imaging system
124 optical imaging system
126 microscope head
128 controller
130 positioning device
332 processor
334 memory
336 computer system
338 monitor
340 keyboard
342 computer mouse
344 touchscreen
O1 optical axis
O2 optical axis
O3 optical axis

The invention claimed is:
1. A digital microscope system, comprising:
a plurality of camera systems for imaging a target region of an object, each camera system comprising a digital camera and an optical imaging system being aligned along an optical axis of said camera system, wherein the optical axes of the camera systems are parallel to each other;
a microscope stage, on which the object is to be arranged;
a positioning device; and
a controller configured to control the positioning device to move the plurality of camera systems and the microscope stage relative to each other orthogonally to the optical axes of the camera systems for selectively aligning any one of the camera systems with the target region of the object; wherein:

the camera systems are configured to generate digital image data representing the target region in accordance with a setting, said setting determining which one of the plurality of camera systems is to be aligned with the object;

the controller is configured to generate monitor image data corresponding to the digital image data generated in accordance with the setting, the monitor image data being configured to be displayed as a monitor image;

the controller is configured to change the setting to a changed setting in response to a user input; and the controller is configured to compensate for a delay in updating the monitor image data in accordance with the changed setting by:

storing the digital image data generated in accordance with the setting before the setting was changed in response to the user input and generating simulation monitor image data by performing digital image processing on the stored digital image data taking into account the changed setting, the simulation monitor image data being configured to be displayed as a simulation monitor image during the delay;

wherein the controller is further configured to update the monitor image data in accordance with the changed setting by:

generating changed digital image data representing the target region in accordance with the changed setting based on imaging the target region by means of the second camera system; and displaying a changed monitor image corresponding to the changed digital image data in place of the displayed simulated monitor image.

2. The digital microscope system according to claim 1, comprising a microscope head including the plurality of camera systems, wherein the positioning device is configured to move the microscope head orthogonally to the optical axes of the camera systems.

3. The digital microscope system according to claim 1, wherein the optical axes of the camera systems are arranged on a common plane, and
the positioning device is configured to move the camera systems along said plane.

4. The digital microscope system according to claim 1, having a total magnification range being composed of a plurality of magnification subranges provided by a plurality of magnification changing systems.

5. The digital microscope system according to claim 1, wherein at least one of the camera systems comprises a magnification changing system.

6. The digital microscope system according to claim 5, wherein the magnification changing system comprises a zoom system.

7. The digital microscope system according to claim 6, wherein the zoom system comprises an optical zoom system formed by said optical imaging system of the associated camera system.

8. The digital microscope system according to claim 6, wherein the zoom system comprises a digital zoom system formed by said digital camera of the associated camera system.

9. The digital microscope system according to claim 8, wherein the magnification changing system comprises a fixed magnification optical system formed by said optical imaging system of the associated camera system.

10. The digital microscope system according to claim 5, wherein at least two of the camera systems comprise a respective magnification changing system, wherein the magnification changing system of one of the plurality of the camera systems comprises an optical zoom system, and the magnification changing system of another of the plurality of camera systems comprises a digital zoom system.

11. The digital microscope system according to claim 1, wherein the controller is further configured
to receive a user input specifying an imaging parameter based on which the target region is to be imaged,
to select one of the plurality of camera systems to be aligned with the target region based on the imaging parameter, and
to control the positioning device for aligning the selected camera system with target region.

12. The digital microscope system according to claim 11, wherein the imaging parameter comprises one of an image resolution and a magnification.

13. The digital microscope system according to claim 1, wherein the controller is further configured to control the positioning device for selectively aligning any one of the optical axes of the plurality of camera systems with a predetermined target position of the object, the target position being the same regardless of the selected camera system.

14. The digital microscope system according to claim 13, wherein the target position is a center of the target region.

15. A method for operating a digital microscope system, comprising the steps of:
positioning a target region of an object on an optical axis of a first camera system;
imaging the target region by means of the first camera system to generate digital image data representing the target region in accordance with a setting;
displaying a monitor image corresponding to the digital image data;
storing the digital image data;
changing the setting to a changed setting in response to a user input;
generating simulation monitor image data by performing digital image processing on the stored digital image data taking into account the changed setting;
displaying a simulated monitor image corresponding to the simulation monitor image data in place of the displayed monitor image;
receiving a positioning signal based on the user input;
positioning the target region in accordance with the positioning signal on an optical axis of a second camera system;
imaging the target region by means of the second camera system;
generating changed digital image data representing the target region in accordance with the changed setting based on imaging the target region by means of the second camera system; and
displaying a changed monitor image corresponding to the changed digital image data in place of the displayed simulated monitor image.

16. A non-transitory computer-readable medium storing a computer program comprising instructions which, when the instructions are executed by a processor, cause the processor to perform the method according to claim 15.

* * * * *